United States Patent [19]
Remes et al.

[11] Patent Number: 5,561,983
[45] Date of Patent: Oct. 8, 1996

[54] CRYOGENIC LIQUID DELIVERY SYSTEM

[75] Inventors: Richard S. Remes, Burnsville; Jeffrey S. Dresow, New Prague, both of Minn.

[73] Assignee: Caire, Inc., New Prague, Minn.

[21] Appl. No.: 500,236

[22] Filed: Jul. 10, 1995

[51] Int. Cl.⁶ ..................................... F17C 7/04
[52] U.S. Cl. ................. 62/48.1; 62/50.2; 62/50.7
[58] Field of Search ................... 62/48.1, 50.2, 62/50.7

[56] References Cited

U.S. PATENT DOCUMENTS

| | | | |
|---|---|---|---|
| 3,386,256 | 6/1968 | Alexander | 62/50.7 |
| 3,433,028 | 3/1969 | Klee | 62/50.7 |
| 4,715,187 | 12/1987 | Stearns | 62/50.7 |
| 5,195,325 | 3/1993 | Short et al. | 62/50.2 |

Primary Examiner—Ronald C. Capossela
Attorney, Agent, or Firm—Rockey, Rifkin and Ryther

[57] ABSTRACT

A cryogenic liquid delivery system includes a storage tank holding a quantity of a cryogenic liquid such as liquid oxygen and a vapor space. A compound, two-part dip tube includes an inner liquid delivery tube and an outer tube which is sealed to allow liquid cryogen to be delivered to a vaporizer only via the liquid delivery tube. The vaporizer communicates with the vapor space in the tank via an aperture in the outer tube, above the level of the liquid cryogen and the seal.

6 Claims, 4 Drawing Sheets

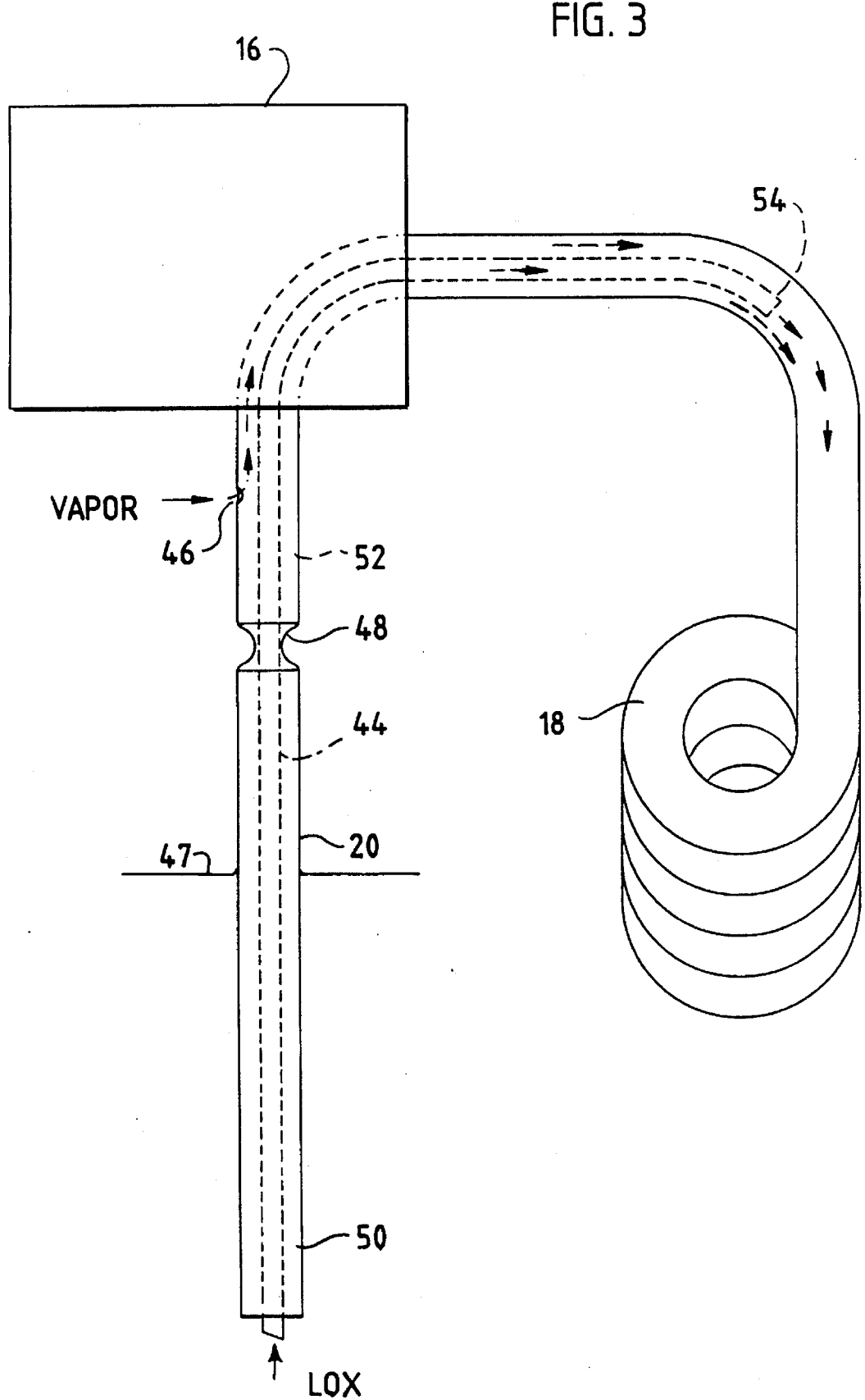

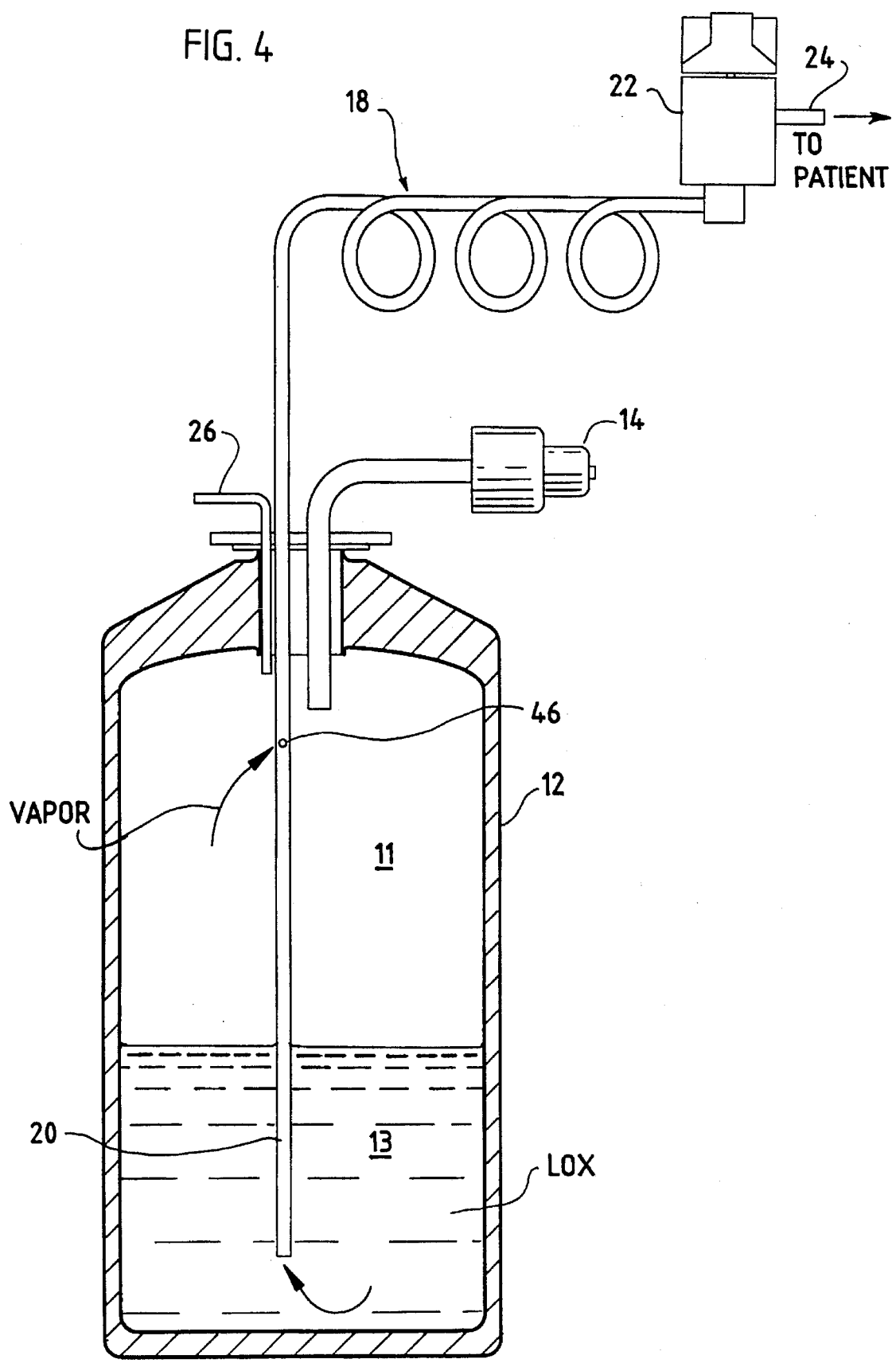

5,561,983

CRYOGENIC LIQUID DELIVERY SYSTEM

BACKGROUND OF THE INVENTION

The present invention generally relates to oxygen delivery systems and, more particularly, to an improved portable system having an extended use time for efficiently delivering vaporized liquid oxygen to a patient.

Oxygen delivery systems are used in a wide variety of applications. Liquid oxygen delivery systems have the advantage that a much greater quantity of oxygen can be stored in liquid form than can be stored as a gas. The liquid oxygen can be delivered to a use device in that form or can be converted to a gas and then delivered.

An exemplary liquid oxygen delivery system is a portable oxygen delivery apparatus which vaporizes liquid oxygen and delivers the resulting vapor to a patient via a cannula. This type of system typically consists of a portable, thermally insulated tank for holding a quantity of liquid oxygen. A dip tube extends into the tank and conveys the liquid to a vaporizer coil for conversion to a gas. An adjustable flow control valve permits the patient to control the flow of oxygen gas from the vaporizer to the cannula.

High efficiency vaporizers are desirably used in liquid oxygen delivery systems for quickly vaporizing a desired volume of liquid oxygen. High volume vaporization is generally beneficial so that oxygen flow requirements can be promptly satisfied. However, it will be appreciated that when vapor production exceeds the demand for oxygen vapor, an increase in tank pressure results creating a significant back pressure in the tank. When the pressure reaches a predetermined maximum, a relief valve opens to vent oxygen to the atmosphere. While venting maintains the system pressure within acceptable limits, it is wasteful and significantly shortens the use time of the delivery system.

Accordingly, an efficient delivery system for cryogenic liquids having an extended use time and that minimizes pressure build-up from excess vaporization is desired.

SUMMARY OF THE INVENTION

The portable cryogenic liquid delivery system of the invention comprises a thermally insulated storage tank holding a quantity of a cryogenic liquid such as liquid oxygen and a vapor space. A compound, two-part dip tube having an inner liquid delivery tube positioned therein extends into the liquid cryogen. An outer tube surrounding the inner tube is sealed to prevent liquid cryogen from entering the annular space therebetween. The vaporizer communicates with the tank's vapor space via the annular space and an aperture in the outer tube at a location above the level of the liquid cryogen and the seal. When a demand for gas is made, both gas from the vapor space in the tank and liquid cryogen are withdrawn. The size of the aperture insures a minimum pressure required for fluid flow. Use of gas from the vapor space avoids venting it to atmosphere thereby extending the use time of the delivery system.

BRIEF DESCRIPTION OF THE DRAWINGS

FIG. 3 is a sectional view of a portion of the dip tube shown in FIG. 1.

FIG. 4 is a flow diagram of the delivery system shown in FIG. 1.

DETAILED DESCRIPTION OF THE INVENTION

Figure 1:
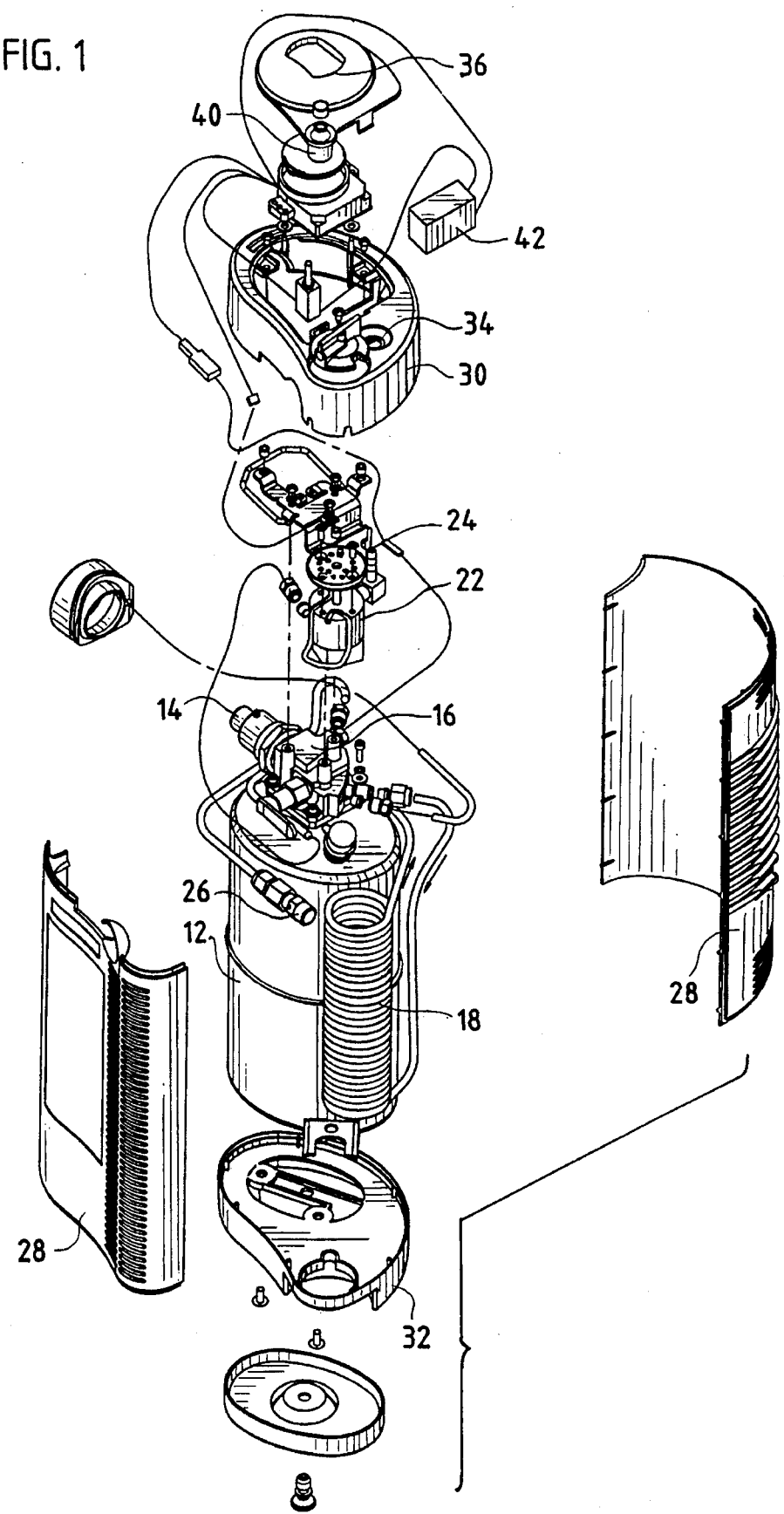
FIG. 1 is an exploded view of the portable liquid delivery system of the invention.

Referring to FIG. 1, an exploded perspective view of a portable cryogenic liquid delivery system is illustrated. The system comprises an insulated tank 12 containing a supply of a liquid cryogen such as liquid oxygen. A bayonet fill valve 14 is connected to manifold assembly 16 and communicates with the interior of the tank 12 to permit it to be filled with liquid oxygen from a larger tank (not shown). A high efficiency vaporizer coil 18 is connected to manifold assembly 16 to permit the liquid oxygen to be vaporized and delivered in gaseous form to a patient via adjustable flow control valve 22 and outlet 24. A relief valve 26 communicates with the interior of tank 12 through manifold 16 to vent oxygen gas to the atmosphere when the pressure in tank 12 rises above a predetermined threshold value.

The delivery system is contained within a housing comprising side panels 28, top panel 30 and bottom assembly 32. Outlet 24 is adapted to permit a cannula (not shown) to be connected thereto for delivery of oxygen to a patient. A display window 36 is mounted to housing panel 30 over an indicator 40 which provides a visual reference of the quantity of liquid oxygen contained in tank 12 which is measured by a level sensor (not shown). The level sensor and indicator 40 are powered by battery 42.

Figure 2:
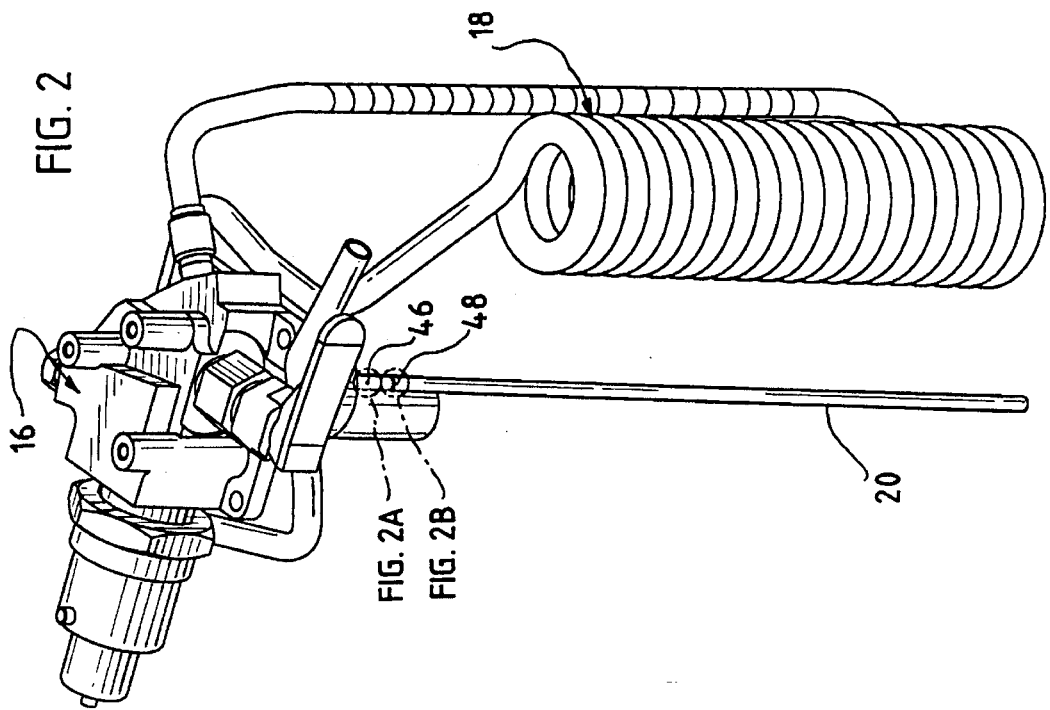
FIG. 2 is a perspective view of the dip tube and vaporizer assemblies shown in FIG. 1.
Figure 2A:
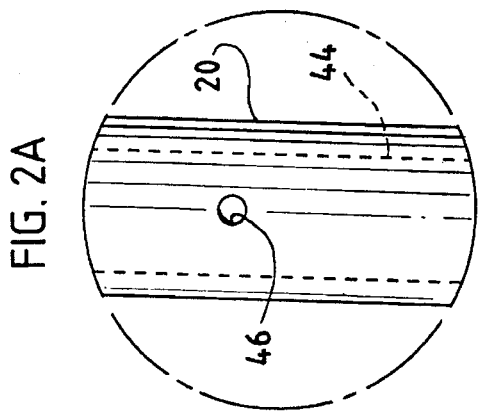
FIGS. 2A and 2B are enlarged views of portions of the upper end of the dip tube shown in FIG. 2.
Figure 2B:
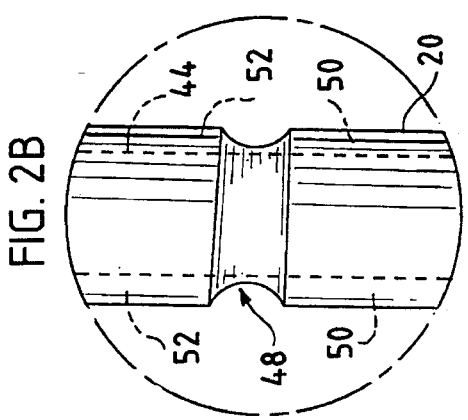

Referring to FIGS. 2, 2A, and 2B, a dip tube 20 is preferably formed of stainless steel and concentrically receives a reduced diameter Teflon tube 44 in its interior defining an annular space therebetween. Dip tube 20 includes a small aperture 46 at its upper end (FIG. 2A) communicating with the vapor space of tank 12. A seal 48, preferably a crimp formed in tube 20, is located below aperture 46 (FIG. 2B). Seal 48 prevents the flow of liquid oxygen above it. Thus, liquid is in annular space 50 but only vapor can fill space 52.

Vaporizer 18 comprises a highly efficient twisted tube heat exchanger coil and is provided to vaporize liquid oxygen from tank 12 into breathable oxygen gas which is delivered to a patient via outlet 24 (FIG. 1). Vaporizer coils of this type suitable for use with the present invention are manufactured by Delta T, Ltd., Tulsa, Okla.

Referring to FIG. 3, aperture 46 is positioned on tube 20 at a level above a maximum fill level 47 of the tank so that liquid oxygen is delivered to vaporizer 18 only via the Teflon inner tube 44. Aperture 46 permits vapor in space 11 to be entrained with the liquid oxygen in tube 44 as it exits at 54. This use of the vapor head prevents excess pressure build-up to avoid venting to the atmosphere.

Referring to FIG. 4, tank 12 can be connected to a supply of liquid oxygen for filling. When initially filled with liquid oxygen 13, the system pressure in tank 12 is preferably about twenty pounds per square inch. During use, a patient sets the flow control valve 22 to call for a predetermined flow rate of vaporized liquid oxygen ranging, for example, from almost zero to approximately six liters per minute.

When this demand is made, the pressure head 11 in tank 12 forces liquid oxygen to flow into Teflon liquid delivery tube 44 to coil 18. The liquid oxygen is vaporized by coil 18 and delivered to the patient via outlet 24 and a cannula. It will be appreciated that when vapor production exceeds vapor demand or the tank is not used for a while, an increase in tank pressure results. If the tank pressure rises above a predetermined threshold, relief valve 26 opens to vent oxygen vapor to the atmosphere.

A unique feature of the applicant's invention, however, is that such venting can be reduced or prevented by delivering a portion of the oxygen vapor to the patient from space 11 via aperture 46. Delivering oxygen vapor from space 11 to the patient helps to maintain the pressure of tank 12 within desired limits thereby minimizing the necessity of venting vapor to atmosphere. Accordingly, the use time provided by the liquid oxygen delivery system is significantly extended over other delivery systems.

Preferably, the diameters of dip tube 20, liquid delivery tube 44 and aperture 46 are 0.125, 0.039 and 0.007 inches, respectively. In this case, oxygen vapor flows from space 11 to vaporizer 18 at a rate between 0.35 and 0.62 liters per minute if the tank pressure is approximately twenty pounds per square inch. The use time of the delivery system is increased from approximately six to eight hours. It will be appreciated that decreasing the size of aperture 46 correspondingly decreases the flow rate from space 11. Proper selection of its diameter is important as a minimum vapor head pressure is required to deliver liquid oxygen to the vaporizer coil 18. For example, decreasing the diameter of aperture 46 to 0.006 inches decreases the vapor flow rate to a range between 0.25 and 0.45 liters per minute.

While the invention has been illustrated and described in detail in the drawings and the foregoing description, the same is to be considered as illustrative and not restrictive in character, it being understood that only the preferred embodiment has been shown and described and that all changes and modifications that come within the spirit of the invention are desired to be protected. For example, the delivery system of the invention can be used with any cryogenic liquid such as oxygen, hydrogen, nitrogen or the like to extend delivery time by preventing unnecessary venting.

What is claimed is:

1. A system for delivering a vaporized cryogenic liquid comprising:
   (a) a storage tank holding a quantity of a cryogenic liquid and having a vapor space above the liquid;
   (b) a compound dip tube positioned in said tank including an outer tube and a coaxially disposed inner tube of smaller diameter defining an annular space therebetween, said outer tube having an aperture in communication with said vapor space;
   (c) means for receiving and vaporizing cryogenic liquid from said inner tube and vapor from the vapor space via said aperture and said annular space; and
   (d) means for sealing the annular space to prevent liquid from travelling therein whereby excessive pressure in the tank is minimized and the use time of the delivery system is extended.

2. The system of claim 1 wherein said cryogenic liquid is oxygen.

3. The system of claim 1 wherein said vaporizing means comprises a fluted tube heat exchanger coil.

4. The system of claim 1 wherein said sealing means comprises a crimp in said outer tube at a point below said aperture.

5. The system of claim 1 further comprising a relief valve connected to said tank, said relief valve opening at a predetermined maximum value to vent vapor from said vapor space to atmosphere.

6. The system of claim 1 wherein the size of said aperture is dimensioned to maintain the minimum pressure in said tank required to deliver liquid to said vaporizer means.

* * * * *